(12) United States Patent
Hamilton

(10) Patent No.: US 6,361,123 B1
(45) Date of Patent: Mar. 26, 2002

(54) YAW CONTROL SYSTEM

(76) Inventor: James T. Hamilton, 1347 Clay Springs Dr., Carmel, IN (US) 46032

(*) Notice: Subject to any disclaimer, the term of this patent is extended or adjusted under 35 U.S.C. 154(b) by 0 days.

(21) Appl. No.: 09/621,251

(22) Filed: Jul. 21, 2000

Related U.S. Application Data

(60) Provisional application No. 60/145,841, filed on Jul. 27, 1999.

(51) Int. Cl.[7] .................................................. B60T 8/32
(52) U.S. Cl. ..................... 303/9.68; 303/24.1; 303/140; 303/DIG. 6; 303/181; 180/197; 180/245
(58) Field of Search ................................ 303/140, 146, 303/24.1, 9.67, 9.68, DIG. 6, 179, 180, 181; 180/245, 233, 248, 249, 247, 197

(56) References Cited

U.S. PATENT DOCUMENTS

| | | | | |
|---|---|---|---|---|
| 3,608,980 A | * | 9/1971 | Pawl | ........................... 303/22.1 |
| 3,840,278 A | * | 10/1974 | Fleischer et al. | ........... 303/22.1 |
| 3,950,037 A | | 4/1976 | Pembleton et al. | |
| 4,113,318 A | * | 9/1978 | Doi | ............................. 303/9.68 |
| 4,159,855 A | | 7/1979 | Falk | |
| 4,779,933 A | * | 10/1988 | Schonlau et al. | ........... 303/9.73 |
| 5,058,700 A | | 10/1991 | Shibahata | |

\* cited by examiner

Primary Examiner—Pam Rodriguez
(74) Attorney, Agent, or Firm—Baker & Daniels

(57) ABSTRACT

A yaw control system for an automotive drivetrain includes an equal torque differential, an engine-driven hydraulic pump, and hydraulically actuated control brakes operable to apply a resistive torque to either a left or right axle of the driven wheels. An acceleration-responsive control valve actuates one of the control brakes according to the direction of lateral acceleration of the vehicle. The control valve includes an inertial or seismic mass that moves a valve member to connect or disconnect the control brakes from the hydraulic pump. The control brakes are attached to the vehicle chassis so the resistive torque is reacted through the chassis, thereby inducing a yaw moment that coincides with and assists the turning of the vehicle.

13 Claims, 4 Drawing Sheets

YAW CONTROL SYSTEM

REFERENCE TO RELATED APPLICATION

This application claims benefit of priority from provisional application 60/145,841, filed Jul. 27, 1999.

BACKGROUND OF THE INVENTION

The present invention relates generally to drive train components for automotive, truck, and industrial uses, and more specifically to differentials that permit unequal rotational speeds between driven wheels. In particular, the present invention relates to a yaw control feature for automotive differentials.

The traditional differentials are a well-known component of an automotive drive train. The differential operates to distribute torque evenly between driven wheels, even when the wheels are rotating at different speeds. Initially, the differential was implemented to facilitate cornering of the vehicle and to prevent slip between the inboard wheel and the road surface. One disadvantage of the traditional differential arises because the torque distribution between the driven wheels is geometrically fixed. Thus, when one wheel spins on ice or mud, the torque provided to the other wheel was found to be insufficient to allow the vehicle to pull away.

In order to address this problem, limited-slip differentials were developed that have the capability of changing the speed difference between the driving wheels within a predetermined range. The typical limited-slip differential could operate as a conventional "open", or equal torque, differential, or as a "locked" differential with no speed difference between the driving wheels, or anywhere between these extremes. Most limited-slip differentials use friction clutches between the differential input and output shafts to transmit at least a portion of the driving torque. In this category of limited-slip differentials, no torque is reacted outside the differential housing.

On the other hand, steering brakes for traction vehicles react driving torque through the vehicle chassis. Most traction vehicles do not have a traditional steering box, but instead rely upon deliberately altering the relative rotational speed between driving members to turn the vehicle. Like the steering brake system, certain wheel slip systems, usually referred to as "traction control" systems, also react torque outside the differential housing by actuation of the individual service brakes.

The conventional automotive drive train and differential system adequately serves the driving needs in most automotive applications. However, the utility of these same systems for high performance vehicles is inherently diminished. Due to the nature of operation of the typical differential, either fixed or limited slip, vehicle turning performance is limited. This problem is particularly pronounced in racing vehicles, where controlled high-speed turns are essential. There remains a need for a vehicle drive train system, and particularly for a differential system, that improves vehicle turning performance.

SUMMARY OF THE INVENTION

In order to address these needs, the present invention contemplates a yaw control system that can be integrated into an automotive drivetrain, particular at the differential. In one feature of the invention, the yaw control system includes a mechanism for applying a resistive torque to the axle of one of the driven wheels. In a preferred embodiment, the mechanism is a control brake operating on a flywheel or disc rotating with a drive wheel axle. Each control brake is hydraulically actuated, so the yaw control system contemplates a hydraulics system connecting the control brakes to a fluid source. Preferably, the fluid source is an engine-driven hydraulic pump.

In one important feature of the invention, each control brake is connected to the vehicle chassis to the resistive torque applied to the particular axle is reacted through the vehicle chassis. This torque reaction manifests itself as a yaw moment that augments the ability of the vehicle to negotiate a turn. To achieve this function, a further important feature of the invention includes an acceleration responsive control valve that selectively connects or disconnects the control brakes from the fluid source based on lateral acceleration of the vehicle as it travels through a turn. In this feature, the control valve includes an inertial or seismic mass that moves in the direction of the vehicle acceleration vector. The inertial mass is attached to a valve member that is operable to make a fluid connection between either control brake and the fluid source as the member is moved by movement of the inertial mass.

In a preferred embodiment, the valve member and inertial mass are pivotably mounted so that the valve member assumes a neutral position in which the control brakes are disconnected from the fluid source. When the vehicle turns, a lateral acceleration arises that moves the inertial mass to one side or another, thereby causing the valve member to pivot to a first or a second position alternately connecting one or the other control brake to the fluid source to activate the brake.

It is one object of the invention to facilitate and enhance the turning ability of an automotive vehicle, particularly a high performance or racing vehicle. It is another object to overcome some of the detriments of standard automotive differentials that reduce turning performance of a vehicle.

One benefit of the invention is that wheel slip is reduced in a tight turn, even for a vehicle having a constant torque differential. Another benefit is the functional attributes of the differential can be used to generate a turn-enhancing yaw moment within the vehicle. These and other objects and benefits provided by the present invention can be discerned from the following written description and accompanying figures.

DETAILED DESCRIPTION OF THE INVENTION

Figure 1:
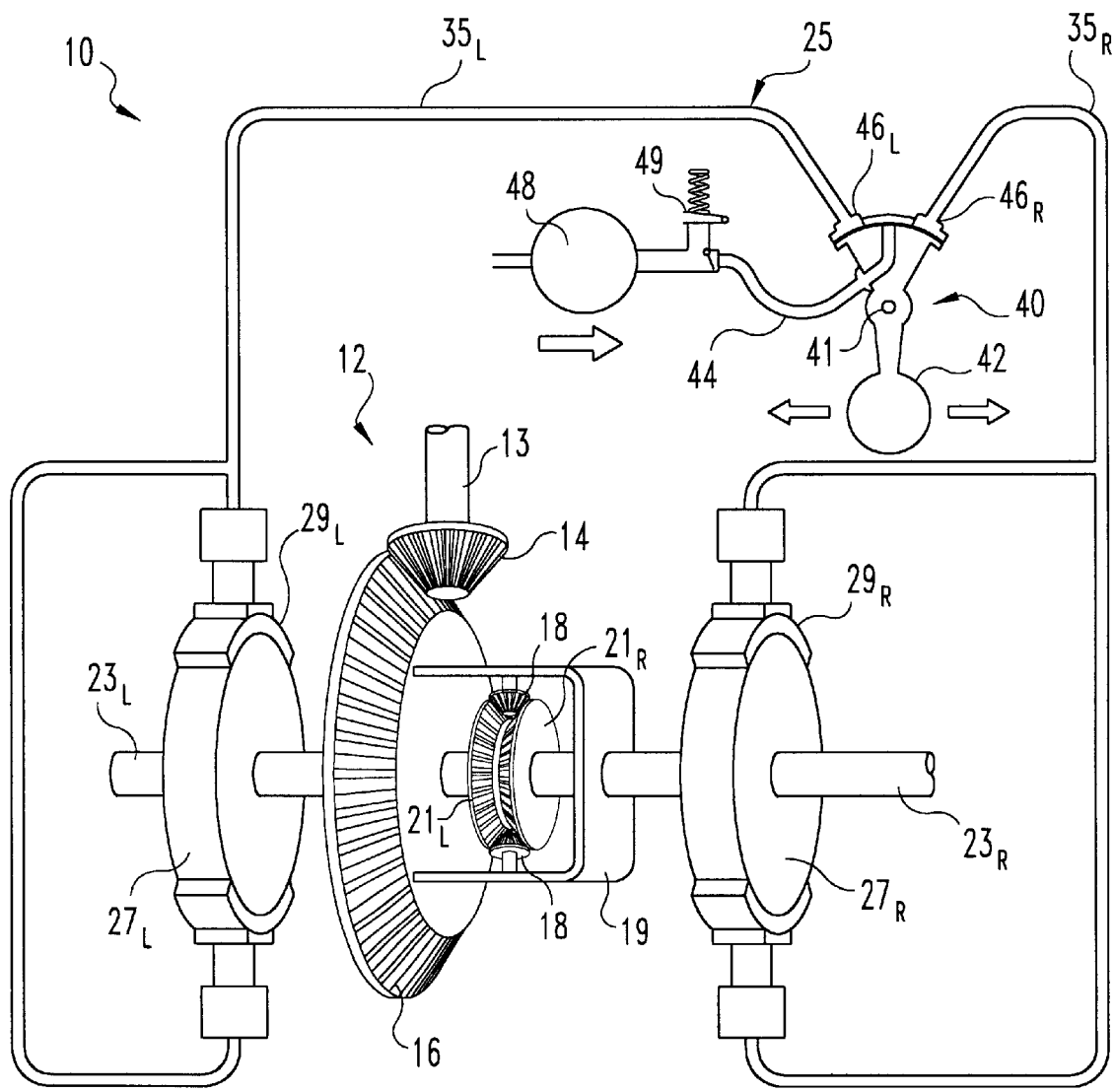
FIG. 1 is a schematic diagram of the yaw control system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

FIG. 1 is a schematic diagram of one embodiment of a yaw control system of the present invention. A drive train 10 includes a differential 12 that receives power from the associated vehicle engine through drive shaft 13. For instance, the differential can include a driving pinion 14 connected to the drive shaft to transmit power to a ring gear 16. An array of planet gears 18 is attached to the ring gear 16 by way of a cage 19 so that the planet gears rotate with the ring gear. The planet gears 18 mesh with a pair of side gears $21_L$ and $21_R$ which are in turn connected to a corresponding wheel axle $23_L$ and $23_R$. Each wheel axle $23_L$, $23_R$ provides power to an associated left or right wheel of the vehicle in a conventional manner. The differential 12 can be of a variety of alternative constructions, although preferably configured to operate as a conventional equal torque differential when the associated vehicle is operated normally, with low wheel slip, in a straight line, and at low lateral accelerations.

As thus far described, the drive train 10 is of conventional design. While this drivetrain 10 and differential 12 are acceptable for most passenger and commercial automotive vehicles, the even torque distribution achieved by the differential creates problems for high performance vehicles, particularly under tight cornering. In order to address these performance problems, the present invention contemplates a yaw control system 25 that generates a resistance torque to one side or wheel. Thus, the system 25 deliberately injects a torque difference between the driving wheels. In accordance with the invention, the side with less driving torque is almost always on the inside of a turn. In addition, the invention allows the resistance torque to be reacted through the vehicle chassis.

The torque difference thus created has two major effects on the vehicle. First, wheel slip on the lesser-loaded inboard driving wheel is reduced by the reduced output torque to that wheel. Second, the difference in torque creates an unbalanced yaw moment that acts to help turn the vehicle. Vehicle dynamics for high performance vehicles, such as racing vehicles, cause the vehicle to resist turning in conditions of high lateral acceleration. This dynamic is particularly acute in tighter turns where effects such as drag understeer are significant. In accordance with the present invention, the compensating effect of the controlled unbalanced yaw moment results in a significant increase in handling performance. From a racing standpoint, the yaw control system 25 allows the driver to make controlled higher speed turns than is permitted by present vehicle drivetrain designs.

Figure 4:
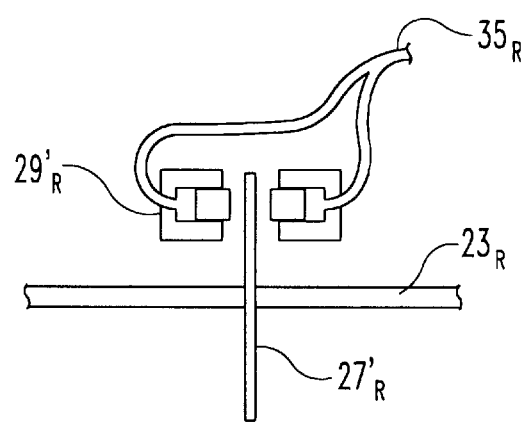
FIG. 4 is a partial schematic view of another control brake assembly for use in the yaw control system according to the present invention.

In accordance with one embodiment of the invention, the yaw control system 25 includes a flywheel $27_L$, $27_R$, mounted to a corresponding left or right wheel axle $23_L$, $23_R$. A corresponding control brake $29_L$, $29_R$ is associated with each flywheel $27_L$, $27_R$ and configured to apply a braking force or resistance torque to the rotating flywheel. The control brakes $29_L$, $29_R$ depicted in FIG. 1 take the form of drum brakes, although other forms of braking mechanisms are contemplated. For instance, the flywheel 27 can be replaced by a rotating disc 27', and the drum brakes by disc or caliper brakes 29', as depicted in FIG. 4. For the purposes of the present invention, the exact form of the control brakes can vary, provided that resistance torque is reacted through the control brakes and to the vehicle chassis. In a further aspect, the control brakes $29_L$, $29_R$ are selectively operable by the application of fluid pressure, preferably hydraulic.

In another feature of the yaw control system 25, means are provided activating an appropriate control brake in response to a lateral acceleration of the vehicle. Each control brake $29_L$, $29_R$ is supplied with pressurized fluid through fluid lines $35_L$, $35_R$. The fluid lines $35_L$, $35_R$ are supplied with fluid under pressure driven by pump 48. A pressure relief valve 49 can be provided to control the pressure of the output fluid provided to the fluid lines $35_L$, $35_R$.

Figure 2:
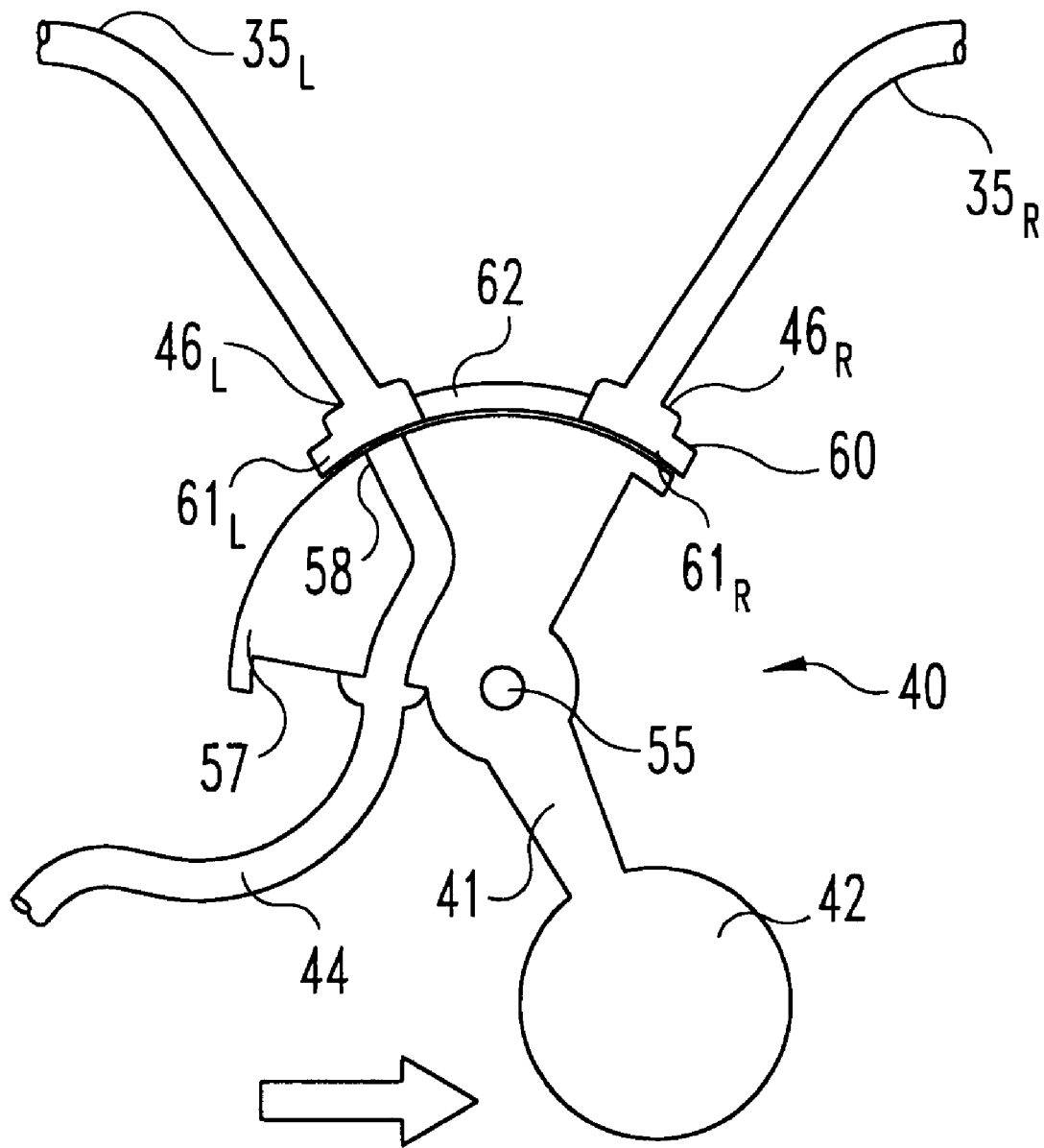
FIG. 2 is an enlarged side view of a control valve for use with the yaw control system depicted in FIG. 1, illustrating the valve in an activated position.

An important feature of the yaw control system 25 is the control valve assembly 40 interposed between the pump 48 and the fluid lines $35_L$, $35_R$. The control valve assembly is operable to selectively connect either of the left or right fluid lines $35_L$, $35_R$ with the fluid source. More specifically, the control valve assembly 40 is configured to automatically control the flow through either fluid line in response to the direction of lateral acceleration of the associated vehicle. This function is accomplished by valve member 41 incorporating an inertial or seismic mass 42 that is responsive to this lateral acceleration. One embodiment of the control valve assembly 40 is illustrated in FIG. 2. In this embodiment, the valve member 41 is supported at a pivot mount 55 so that the inertial mass 42 can swing in a vertical plane in response to a lateral acceleration of the vehicle.

The valve member 41 includes a head 57 that supports an input line 44 connected to the fluid source/pump 48. The input line 44 opens at a distribution port 58 defined in the head 57. A distribution manifold 60 is connected to each fluid line $35_L$, $35_R$ to selectively provide a fluid path between the distribution port 58 and each line. In the preferred embodiment, the manifold 60 is divided into a left and a right chamber $61_L$, $61_R$, respectively, with each chamber including a corresponding outlet port $46_L$, $46_R$ providing a fluid connection to a corresponding left or right fluid line. The manifold 60 can also include a neutral chamber 62 between the left and right chambers.

When the inertial mass 42 is in its neutral position, the mass hangs vertically downward. In this position, the distribution port 58 is aligned with the neutral chamber 62. Fluid provided from the pump 48 through input line 44 is not fed to either the left or the right input line $35_L$, $35_R$ in this orientation. However, when the vehicle turns at a sufficient rate, the lateral acceleration causes the inertial mass 42 to move either left or right, depending upon the direction of the acceleration vector. As the inertial mass 42 moves, the valve member 41 pivots about pivot mount 55 so that the distribution port 58 becomes aligned with one of the left or right chambers $61_L$, $61_R$. Fluid is then free to flow from the pump 48 through one chamber of the control valve 40, for instance the left chamber $61_L$ as depicted in FIG. 2, and ultimately into the specific fluid line $35_L$. Pressurized fluid flowing through the fluid line $35_L$ is fed to the corresponding control brake, in this case the left brake $29_L$ to create braking friction between the left output shaft $23_L$ and the non-rotating housing of the brake fixed to the vehicle chassis. Of course, pivoting of the valve member 41 and inertial mass 42 in the opposite direction produces the same result at the right side control brake $29_R$.

Since the resistance torque generated by the control brake subtracts from the ultimate driving torque delivered to the drive wheel on that side, wheel slip at that side is reduced. In addition, since the resistance torque is reacted through the housing of the control brake, and ultimately the vehicle chassis, a yaw moment is generated that follows the direction of the turn. Rather than resisting the vehicle turn, as with prior differentials and vehicle drive trains, the yaw control system 25 of the present invention assists the turn.

In accordance with the control valve 40, valve member 41 and inertial mass 42 of the embodiment of FIGS. 1 and 2, the actuated control brake is opposite the direction of the acceleration vector, but on the inside of the vehicle turn. Thus, a left-hand turn of the associated racing vehicle will produce an acceleration vector to the right. This acceleration causes the inertial mass 42 to move or pivot to the right. Since the head 57 and distribution port 58 are on the opposite side of the pivot mount 55, the distribution portion will move to the left and in alignment with the left chamber $61_L$ of the distribution manifold 60.

Once the lateral acceleration has ceased, the inertial mass 42 will seek out its neutral position, so that the distribution port 58 will then feed only the neutral chamber. Fluid return lines (not shown) may be provided to allow fluid pressure in the charged fluid line $35_L$, $35_R$ to be released, thereby allowing the control brake to be released.

As an alternative, the control valve 40 can be a proportioning valve, providing additional fluid pressure during harder lateral accelerations, and vice versa. Of course, greater lateral acceleration results in greater inertial mass movement against the restoring force of gravity. In this instance, the pump 48 can be a constant pressure pump, with the fluid pressure provided at the control brake being determined exclusively by the proportioning. As a further alternative, a non-proportioning control valve can be used with a variable pressure pump. In this instance, the pump would require means to adjust output pressure in response to lateral acceleration.

It is important that the resulting torque difference be controlled automatically, safely and precisely, at least to achieve maximum benefit in a high performance or racing car. Such control may be achieved by the relief valve 49 depicted in FIG. 1. The relief valve can restrict the fluid pressure within fluid lines $35_L$, $35_R$ and 44 to achieve an adjustable and constant resistance force. In other words, the control brakes should not be capable of generating braking force on the order of the force that can be applied by the vehicle service brakes. The relief valve 49 can provide fail-safe protection in this event. Another manner of control can be accomplished by adjusting the threshold at which the inertial mass will activate either fluid line. This can be accomplished by calibrating the weight/mass of the inertial mass 42 relative to the overall distance that the inertial mass must pivot so that the distribution port 58 is aligned with one of the chambers $61_L$, or $61_R$. The movement of the inertial mass is resisted by the downward force of gravity. This resistive or restorative force can be augmented by lateral springs connected on opposite sides of the inertial mass.

Figure 3:
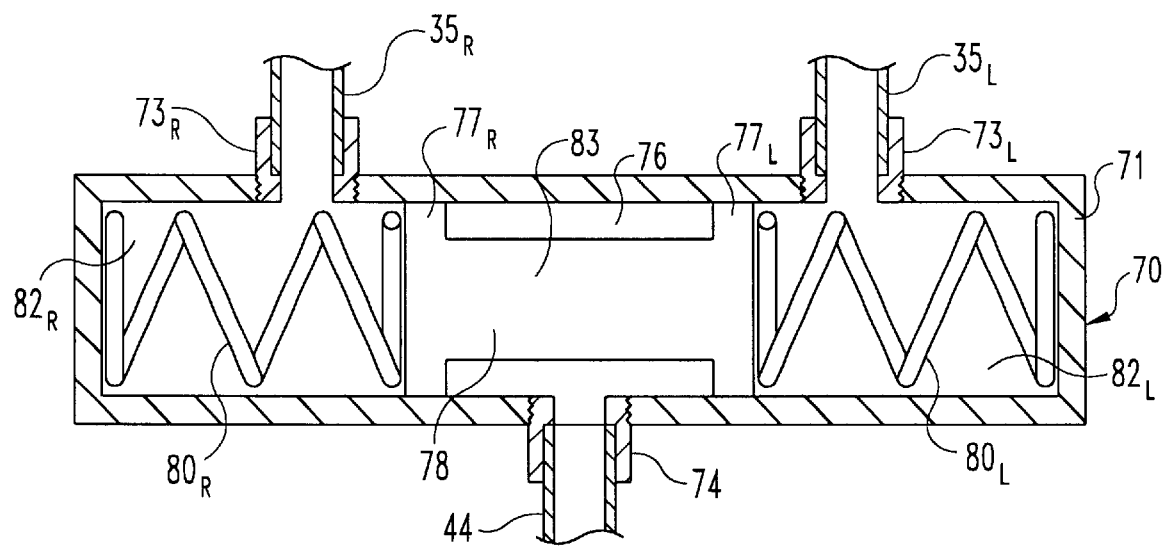
FIG. 3 is an enlarged side view of another control valve for use in the yaw control system according to the present invention.

In the embodiment of FIGS. 1 and 2, the control valve 40 relies upon pivoting movement of the valve member 41 and the inertial mass 42. In some instances, the inertial mass may be susceptible to vehicle vibrations and vertical acceleration, either of which may cause the mass to move form it neutral position in the absence of a vehicle turn. Referring now to FIG. 3, an alternative control valve 70 is depicted that is not sensitive to vertical excitation. In this embodiment, the control valve 70 includes a hollow cylinder 71 that defines an inlet port 74 for connection to the input line 44, and a pair of outlet ports $73_R$ and $73_L$, for connection to the respective left and right fluid lines $35_R$ and $35_L$. An inertial mass 76 is slidably disposed within the cylinder 71. In this embodiment, the inertial mass 76 is preferably in the form of a spool, having opposite enlarged heads $77_R$ and $77_L$ connected by a reduced diameter body 78.

The inertial mass 76 is centrally disposed between the two output ports $73_R$ and $73_L$. A pair of biasing springs $80_R$ and $80_L$ are disposed between a respective head $77_R$ and $77_L$ of the spool and the closed ends of the cylinder 71. The springs $80_R$ and $80_L$, in effect, generate a centering force to bias the inertial mass to its neutral position between the two outlet ports. Thus, the inertial mass 76 divides the cylinder into right and left chambers $82_R$ and $82_L$, and a central neutral chamber 83. The neutral chamber 83 is fed through the inlet port 74. Preferably, the diameter of the two heads $77_R$ and $77_L$ is close to the inner diameter of the cylinder 71 to provide a close running tolerance.

The control valve 70 is mounted in a horizontal orientation within the vehicle and integrated into the fluid system depicted in FIG. 1. A lateral acceleration of the vehicle will cause the inertial mass 76 to translate in the direction of the acceleration vector, resisted only by the force of the restoring or biasing spring $80_R$ and $80_L$. As the inertial mass moves to the right, for instance, the enlarged head $77_L$ traverses the left outlet port $73_L$, thereby opening the port to the central chamber 83. Fluid then flows from input line 44, through the central chamber 83 and into the left fluid line $35_L$. At this point, the operation of the yaw control system is the same as described for the system of FIG. 1. As the lateral acceleration decreases, the biasing spring $82_L$ pushes the inertial mass 76 back to its neutral position.

The control valve 70 of FIG. 3 provides some measure of control as a function of the magnitude of the lateral acceleration. In the preferred embodiment, the outlet ports $77_R$ and $77_L$ are circular. As the head of the inertial mass spool traverses the port, the area of the flow opening increases. The lateral travel of the inertial mass is governed by the relative magnitudes of the lateral acceleration and the spring force.

Figure 5:
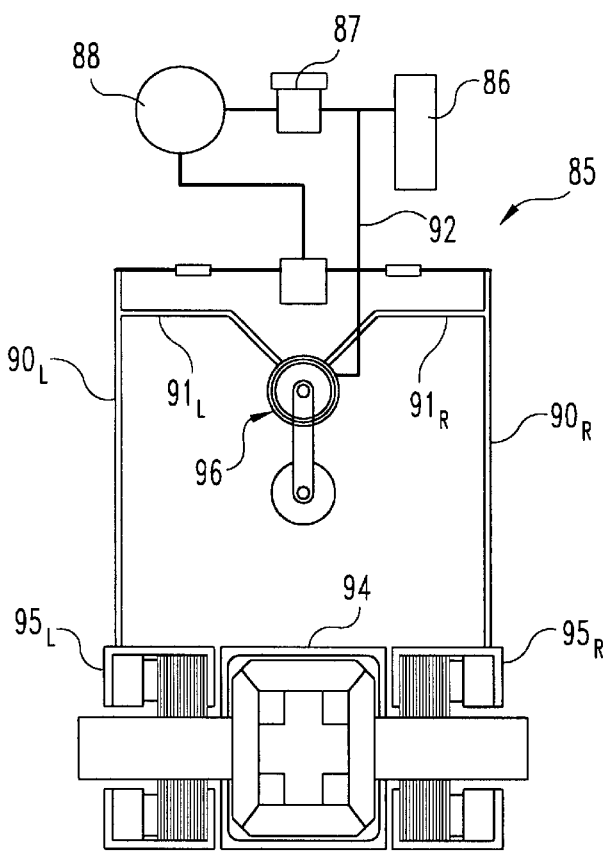
FIG. 5 is a schematic view of a yaw control system according to a further embodiment of the present invention.

Yet another embodiment of the yaw control system of the present invention is illustrated diagrammatically in FIG. 5. The yaw control system 85 includes a fluid reservoir 86 that contains a fixed supply of fluid. The fluid is drawn from the reservoir and through a regulator 87 by a pump 88. The fluid is provided to each of the pressure lines $90_L$ and $90_R$ feeding a respective control brake $95_L$, and $95_R$. In this embodiment, the fluid in the lines $90_L$ and $90_R$ is normally pressurized. In this instance, the control brakes $95_L$ and $95_R$ are normally open when fluid pressure is applied, and closed when the pressure is released. Thus, the yaw control system 90 of this embodiment relies upon bleeding pressure from one fluid line or the other in response to the lateral acceleration to close a control brake about an output shaft of the differential 94.

The fluid system includes bypass lines $91_L$ and $91_R$ that are connected between the respective fluid line $90_L$ and $90_R$ and the control valve 96. The control valve 96 is connected to a fluid return line 92 that bleeds fluid back to the reservoir 86 and regulator 87. As with the prior embodiment, the control valve 96 relies upon a inertial mass to direct connection between one or the other bypass lines $91_L$ and $91_R$ with the return line 92.

Figure 6:
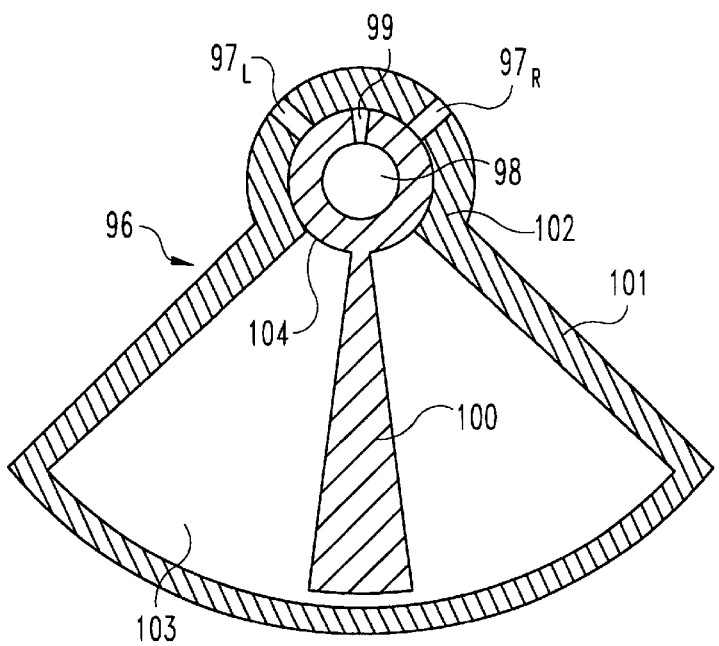
FIG. 6 is an enlarged view of a control valve assembly for use in the yaw control system depicted in FIG. 5.

Details of the control valve 96 are depicted in FIG. 6. The control valve 96 includes a valve housing 101 having the appearance of a fan. The housing 101 defines a pivot housing 102 and an enlarged pivot area 103. The pivot housing 102 defines left and right inlet ports $97_L$ and $97_R$ that are connected to a respective bypass line $91_L$ or $91_R$. The inertial mass 100 is disposed within the housing 101. The mass includes a pivot head 104 that is situated in a close running fit within the pivot housing 102. The pivot head 104 defines a feed orifice 99 that opens into a return outlet 98. The return In one aspect of the present invention, the control brakes react torque through the vehicle chassis. Thus, like the vehicle service brakes, the control brakes 29, 29' and 95 must include some component attached to the vehicle chassis.

In another feature of certain embodiments, the valves 40, 70 and 96 direct fluid to one or the other of the fluid actuated control brakes. Preferably, the fluid is a hydraulic fluid, although pneumatic systems are also contemplated. In certain embodiments, such as for high performance passenger vehicles, the hydraulics for the inventive yaw control systems can be integrated into the overall vehicle hydraulics. However, for racing applications, a separate hydraulic circuit may be preferable so that the active yaw control does not interfere with other hydraulic functions of the vehicle.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For instance, the control brakes 29, 29' and 95 can take a variety of forms, such as disk brakes, band brakes, and the like. In addition, a hydraulic retarder can be implemented in which the resistive torque is proportional to fluid volume, rather than fluid pressure. Likewise the acceleration activated control valves in the yaw control systems 25 or 85 may be replaced with a more sophisticated accelerometer which in turn activates an electric proportioning valve or pulses an electrically activated on/off valve.

What is claimed is:

1. A yaw control system for a vehicle having a chassis carrying at least two driven wheels and a differential coupled to left and right axles for driving respective left and right driven wheels, comprising:
   a fluid source;
   a left brake operable to apply a resistive torque to the left axle;
   a right brake operable to apply a resistive torque to the right axle;
   both said left brake and said right brake operable in response to fluid provided from said fluid source; and
   a control valve connected between said left brake, said right brake, and said fluid source, said control valve including an inertial member having a first position fluidly connecting said left brake to said fluid source, a second position fluidly connecting said right brake to said fluid source, and a neutral position in which neither said left brake nor said right brake is connected to said fluid source, said inertial member movable from said neutral position to either of said first or second positions in response to an acceleration.

2. The yaw control system according to claim 1, wherein said left brake and said right brake are connected to the vehicle chassis to react said resistive torque through the chassis.

3. The yaw control system according to claim 1, wherein said control valve includes:
   a manifold having a first outlet fluidly connected to said left brake and a second outlet fluidly connected to said right brake;
   a valve member pivotably mounted within said control valve and carrying an input line connected to said fluid source; and
   an inertial mass attached to said valve member and movable in response to a lateral acceleration to pivot said valve member from said neutral position to either of said first position in which said input line is in fluid communication with said first outlet or said second position in which said input line is in fluid communication with said second outlet.

4. The yaw control system according to claim 1, wherein said control valve includes:
   a hollow cylinder defining an interior chamber and having a first outlet at one end of said cylinder connected to said left brake, a second outlet at an opposite end of said cylinder connected to said right brake and an inlet disposed between said outlets connected to said fluid source;
   an inertial valve member slidably disposed within said cylinder, said inertial valve member having an enlarged head at opposite ends, each head sized for a close running fit within said cylinder to substantially prevent fluid flow outside said inertial valve member, said inertial valve member movable in response to an acceleration from a neutral position over said inlet to said first position in which said head at one end traverses said first outlet to fluidly connect said first outlet to said inlet, or to said second position in which said head at the opposite end traverses said second outlet to fluidly connect said second outlet to said inlet.

5. The yaw control system according to claim 4, wherein said control valve further includes means for biasing said inertial valve member to said neutral position.

6. The yaw control system according to claim 5, wherein said means for biasing includes a spring disposed within said cylinder and operating against said inertial valve member.

7. The yaw control system according to claim 1, wherein said control valve includes:
   a housing defining a pivot housing and hollow chamber, and further defining a first inlet and a second inlet at said pivot housing; and
   a valve member having a pivot head disposed within said pivot housing, said pivot head having a feed orifice connected to said fluid source, said valve member further including an inertial mass connected to said pivot head to pivot said head within said pivot housing as said inertial mass moves in response to an acceleration from said neutral position in which said feed orifice is positioned between said first and second inlets to said first position in which said feed orifice is in fluid communication with said first inlet, or to said second position in which said feed orifice is fluidly connected to said second inlet.

8. The yaw control system according to claim 1, wherein said control valve includes:
   a hollow cylinder defining an interior chamber and having a first outlet connected to said left brake, a second outlet connected to said right brake and an inlet connected to said fluid source;
   an inertial valve member slidably disposed within said cylinder, said inertial valve member defining a fluid path between said inlet and one of said first outlet or said second outlet, said inertial valve member movable in response to an acceleration from said neutral position to said first position in which said fluid path is defined between said inlet and said first outlet, or to said second position in which said fluid path is defined between said inlet and said second outlet.

9. A yaw control system for a vehicle having a chassis carrying at least two driven wheels and a differential coupled to left and right axles for driving respective left and right driven wheels, comprising:

a fluid source;

a brake operable to apply a resistive torque to one of the left or the right axle in response to fluid provided from said fluid source; and a control valve connected between said brake and said fluid source, said control valve including an inertial member having one position fluidly connecting said brake to said fluid source and a different position in which said brake is not connected to said fluid source, said inertial member movable from said different position to said one position in response to an acceleration.

10. The yaw control system according to claim 9, wherein said brake is connected to the vehicle chassis to react said resistive torque through the chassis.

11. The yaw control system according to claim 9, wherein said control valve includes:

a hollow cylinder defining an interior chamber and having an outlet connected to said brake and an inlet connected to said fluid source;

an inertial valve member slidably disposed within said cylinder, said inertial valve member defining a fluid path between said inlet and said outlet, said inertial valve member movable in response to an acceleration from said different position to said one position in which said fluid path is defined between said inlet and said outlet.

12. The yaw control system according to claim 9, wherein said control valve includes:

a manifold having an outlet connected to said brake;

a valve member pivotably mounted within said control valve and carrying an input line connected to said fluid source; and an inertial mass attached to said valve member and movable in response to an acceleration to pivot said valve member from said different position to said one position in which said fluid line is in fluid communication with said outlet.

13. The yaw control system according to claim 9, wherein:

said brake includes a fluid line connected to said fluid source, and said brake is configured to apply said resistive torque upon a reduction of fluid provided from said fluid source; and said control valve includes a bypass line connected between said fluid line and said fluid source, said one position of said inertial member closing said bypass line and said different position of said inertial member opening said bypass line to divert fluid flow from said fluid line to said bypass line.

* * * * *

UNITED STATES PATENT AND TRADEMARK OFFICE
CERTIFICATE OF CORRECTION

PATENT NO.   : 6,361,123 B1
DATED        : March 26, 2002
INVENTOR(S)  : Hamilton It is certified that error appears in the above-identified patent and that said Letters Patent is hereby corrected as shown below:

Column 7,
Line 4, delete "The return"

Signed and Sealed this

Eleventh Day of June, 2002

Attest:

Attesting Officer

JAMES E. ROGAN
*Director of the United States Patent and Trademark Office*